United States Patent [19]

Powers

[11] Patent Number: 4,693,189
[45] Date of Patent: Sep. 15, 1987

[54] FLUIDIZED BED FEEDER

[76] Inventor: Richard M. Powers, P.O. Box 476, Clifton, Ariz. 85533

[21] Appl. No.: 926,177

[22] Filed: Nov. 3, 1986

[51] Int. Cl.$^4$ ............................................... F23D 1/00
[52] U.S. Cl. ............................. 110/347; 110/101 CD; 110/105; 110/108; 406/124; 406/137
[58] Field of Search ................. 110/105, 108, 101 CD, 110/104 R, 347; 406/136, 137, 121, 124, 134

[56] References Cited

U.S. PATENT DOCUMENTS

| | | | |
|---|---|---|---|
| 3,366,282 | 1/1968 | Lucas | 406/137 X |
| 3,501,062 | 3/1970 | De Witt et al. | 406/134 |
| 4,311,102 | 1/1982 | Kolze et al. | 110/101 CD X |
| 4,496,076 | 1/1985 | Tompkins | 406/137 X |

FOREIGN PATENT DOCUMENTS

| | | | |
|---|---|---|---|
| 1181492 | 1/1959 | France | 406/137 |
| 986559 | 3/1965 | United Kingdom | 406/121 |

Primary Examiner—Edward G. Favors
Attorney, Agent, or Firm—Cushman, Darby & Cushman

[57] ABSTRACT

A method and apparatus for fluidizing combustible material and feeding it to the burner of a furnace is disclosed. The apparatus includes a conventional hopper with a tubular element coupled to the lower most portion of a conical portion thereof. A fluidizing gas delivery apparatus is provided so as to deliver fluidizing gas to the bottom tube. Fluidizing nozzles are also preferably provided at symmetrically spaced circumferential portions of the conical portion of the hopper. With this apparatus, powdered material that is fed to the hopper is fluidized by the fluidizing gas and may be delivered to the burner of a furnace from the bottom tube of the fluidized bed feeder like a liquid and may be readily ignited in the burner and burned completely within the furnace.

35 Claims, 5 Drawing Figures

FLUIDIZED BED FEEDER

BACKGROUND OF THE INVENTION

The present invention relates to the transportation of powdered materials and more particularly to a method of delivering powdered coal, concentrate, or combustible powder to a burner of a furnace so that its burning may be more closely controlled.

In burning powdered coal or concentrate, the powdered material is usually entrained directly from a feeder (such as a screw feeder) into a high velocity air stream which enters the furnace at a burner. To ignite such entrained powdered coal or concentrate especially in a cold furnace the use of auxiliary gas or oil burners is required. A problem with this procedure is that it may be difficult to maintain ignition in the powdered coal burners since feed rates can be irregular or interrupted.

It is also difficult to ensure complete combustion of this material as it passes through the furnace. This creates problems because when coal is being burned it is necessary that the solid effluents from the furnace such as, for example, incompletely burned coal particles be kept to a minimum, not only from the standpoints of health or environmental considerations and of fuel economy, but also for minimizing fouling or carbonization of waste heat boilers.

Flame-out of burners is also a major concern. More particularly, when the feed of combustible materials to the burner is interrupted, the burner may go out or flame-out. Then, when feed is resumed, a large dose of powder will enter the burner and be ignited all at once. Such a flame-out may lead to dust explosions in the furnace. Burners used in the non-ferrous metals industry which are oxygen concentrate or so called "sprinkle" burners are particularly susceptible to flame-out. The "concentrates" fed to these burners are materials such as iron sulfide, copper sulfide and the like, hereinafter referred to simply as concentrate. This type of burner may be inserted in the roof of a reverbratory furnace. Control of the concentrate feed rate to the oxygen burner is central to its proper operation since interrupted feed rates can cause flame-out and hazardous dust explosions within the furnace when concentrate feed resumes suddenly. Such explosions may be damaging to both personnel and the furnace itself.

Numerous attempts have been made to feed fuel to burners in such a manner so as to alleviate the aforementioned problems. However, these feed methods have not satisfactorily overcome the problems involved.

If it is attempted to feed the powdered dense concentrates from a storage reservoir using a vibrated feed tube or hopper, packing tends to occur so that powder leaves the feed tube in clumps, falling through the burner without ignition and collecting in a pile beneath it.

At other times, concentrate fed from a vibrated hopper flows erratically into the oxygen burner, leading to interrupted ignition with the consequent danger of dust explosions.

Experimental fluidized beds have also previously been used to feed, for example, pulverized coal. Thus, Altenkirch et al., in their article entitled "Fluidized Bed Feed of Pulverized Coal", *Powder Technology* 20 (1978) 189–196, report the use of a standard fluidized bed with bottom distribution plate and a means to extract the fluidized coal from the bed. While this system performs well at low coal flow rates, air blockage of the off take tube occurs occasionally or frequently depending on off take design. Dilution air is also necessary when using an off take tube so as to prevent settling out of the coal in the tube and the resultant plugging of the tube. Unplugging the tube is time consuming and often results in changes in coal flow when feeding is resumed. In addition, large volumes of air are needed to fluidize the bed only a small fraction of which is extracted by the off take tube.

It would therefore be desirable to provide a method and device for fluidization of combustibles that would safely permit the feeding of large quantities of fluidized powdered fuel entrained in small quantities of gas directly to a burner.

Furthermore, a more controllable and reproducible method of coal combustion would be desirable, one that would ensure combustion of coal in such a manner that carbonaceous solids would persist to, but not beyond, the bounds of the working furnace chamber.

Additionally, in power plant boilers, it would be advantageous to burn coal powder containing sulphur in excess of that presently allowed without exceeding sulphur dioxide emission limits in the combustion off-gas.

Finally, it would also be desirable to able to burn low volatile coals or chars without danger of flame-out.

SUMMARY OF THE INVENTION

The present invention overcomes the aforementioned problems by providing improved control of the feed of powdered coal, concentrate, or combustible powder to the burner of a furnace by means of a simple method of continually feeding gas, such as nitrogen, argon or natural gas, or air-fluidized powdered coal or concentrate.

More particularly, the present invention provides a fluidizing bed feeder which includes a container that has a cross section that generally decreases from a top portion to a bottom portion thereof, means for introducing fluidizing gas at least centrally proximate the bottom portion of the container, means for introducing powdered feed material to the top portion of the container and wherein the fluidized material is removed from a lowermost portion of the container.

When a stream of coal powder entrained in natural gas, for example, is delivered at a uniform rate to a burner from the feeder of the present invention, ignition of the coal is ensured without flame-out. The rate of coal burn out can then be controlled by undershooting or incorporating into the flame auxiliary enriched air or oxygen, making for better control of the combustion process. Similarly, when a fine dispersion of concentrate fluidized in natural gas is delivered to an oxy-concentrate burner, the possibility of flame-out with its damaging consequences is greatly reduced and prompt ignition of the concentrate in oxygen is insured without preheating combustion air.

BRIEF DESCRIPTION OF THE DRAWINGS

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures and of which:

DETAILED DESCRIPTION OF THE PRESENTLY PREFERRED EXEMPLARY EMBODIMENTS

Figure 1:
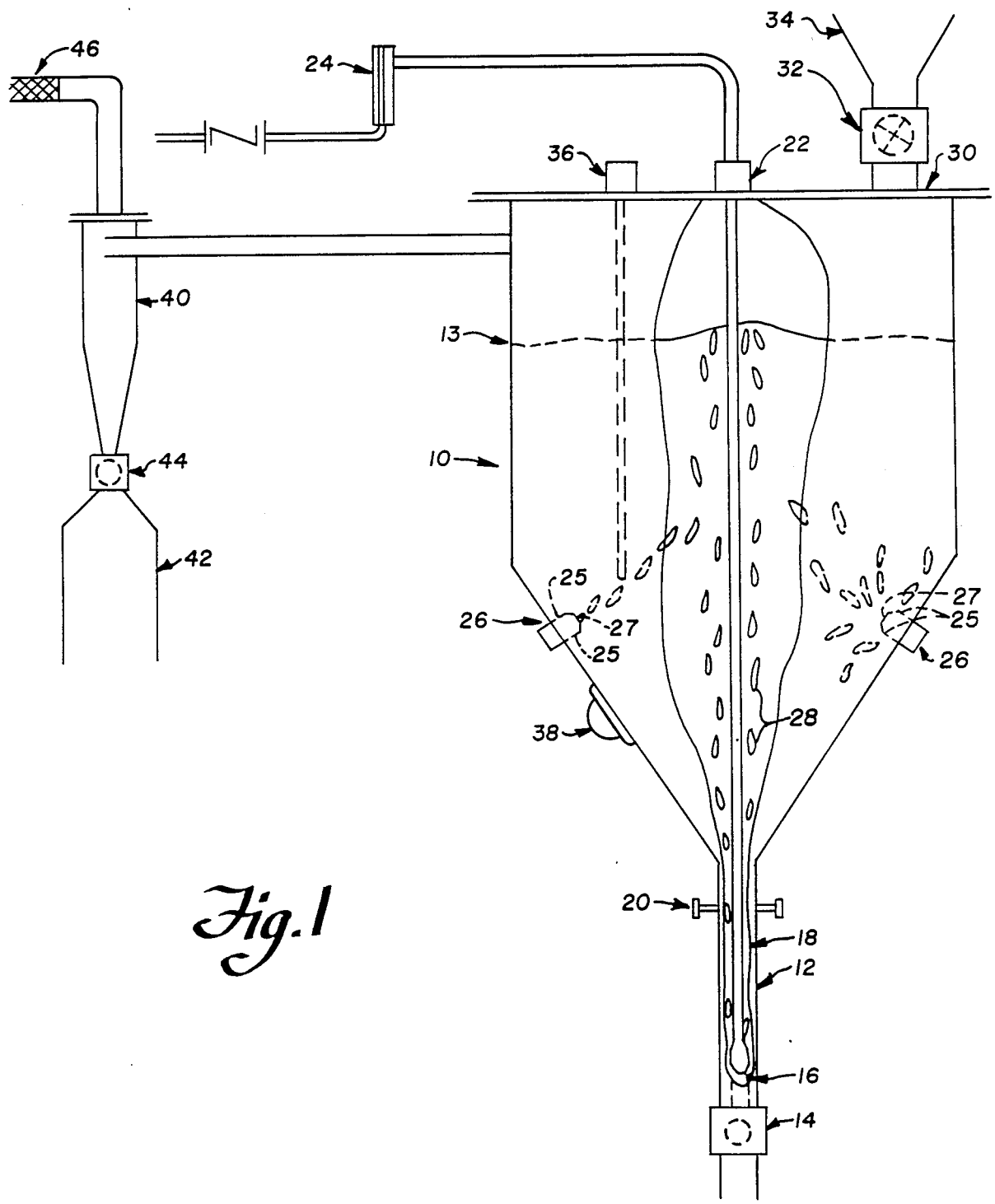
FIG. 1 is a schematic side elevation view partly broken away of a fluidized bed feeder in accordance with the present invention.

Referring to FIG. 1, a first embodiment of a fluidized bed feeder in accordance with the present invention is shown. A conventional feed hopper 10 is provided with a bottom tube 12 of smaller cross section than feed hopper 10. Bottom tube 12 is provided at its lowermost end with a ball valve 14 to allow or prevent flow of feed material from the fluidized bed. Further, adjacent ball valve 14, bottom tube 12 is provided with a tapered seat portion 16 adjacent which a fluidizing tube 18 is disposed, as will be described below.

Figure 2:
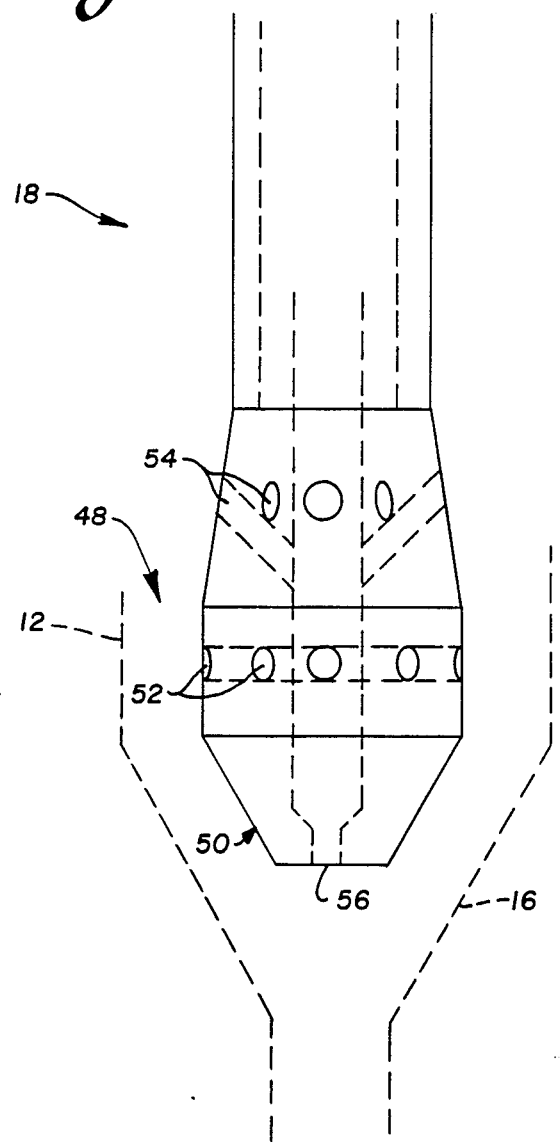
FIG. 2 is an enlarged schematic side elevation view of a fluidizing nozzle in accordance with the present invention.

A fluidizing tube 18 is disposed so as to be centered in bottom tube 12. The details of fluidizing tube 18 are shown in FIG. 2 and will be described below with reference to that figure. Centering means 20 such as screws terminating in a swivel centering fixture or compression sealed centering rods are provided through the wall of bottom tube 12 so as to center fluidizing tube 18 within bottom tube 12. The height of fluidizing tube 18 above tapered seat portion 16 of bottom tube 12 is controlled by adjusting means 22 such as a screw or compression seal. Further, the flow of natural gas or other fluidizing gas into fluidizing tube 18 is regulated by a flow meter 24. Fluidizing gas is introduced into fluidizing tube 18 at such a rate as to produce powder fluidization throughout bottom tube 12 and bottom portion of hopper 10 so that the gas powder mix may flow like water from the fluidized bed feeder.

Most of the powder disposed above the lower portion of hopper 10, where the cross-section is greater, is not fluidized by the gas or air from fluidizing tube 18 except for the column disposed direclty above bottom tube 12, where bubbles 28 from the fluidized bed rise to the surface of the material in hopper 10, growing as they rise, and then break. Thus, to move otherwise stagnent powder adjacent the sidewalls of hopper 10, it is desirable to provide a number of fluidizing nozzles 26, similar in design to the end of fluidizing tube 18, spaced symmetrically about hopper cone 10. Gas jets 25 in each of fluidizing nozzles 26 are directed roughly parallel to the hopper walls with one jet 27 being directed toward the center line of hopper 10, as is shown in phantom lines.

Powder is introduced mechanically through lid 30 of hopper 10 from a gas-tight star feeder 32. The powder flows to star feeder 32 from a upper hopper 34 which is preferably assisted by additional inert gas or air fluidizing jets as will be described with reference to FIG. 4, below. The addition of inert gas prevents spontaneous combustion of freshly ground coal for example during residence in the upper bin.

Further, the level of material contained within hopper 10 is monitored by a level indicator 36. Powder feed rates from star feeder 32 are adjusted so as to match the extraction rate from the fluidized bed with the aid of level indicator 36. More particularly, level indicator 36 should be installed in a lower portion of feed hopper 10, as shown in phantom lines, with feedback control to star feeder 32 so as to maintain that level within 20% or less of a predetermined value. Further, in order to ensure proper functioning of the fluidized bed feeder, level indicator and controller 36 should be installed so as to admit feed from a supply line (not shown in FIG. 1) to hopper 34 on demand so as to maintain star feeder 32 always full of powder.

Two heavy duty bin vibrators 38, only one of which is shown in FIG. 1 for clarity, are provided at 90° with respect to one another so as to ensure flow of fluidized powder down the walls of hopper 10. The provision of vibrators 38 increases the reproducibility of the feed rate of the present fluidized bed feeder as will become apparent from the examples below. The addition of inert gas prevents spontaneous combustion of freshly ground coal for example during residence in the upper bin.

Excess fluidizing gas passes through a cyclone 40 where the small amount of finely divided entrained powder is removed, to be collected in a receiver 42 through a valve 44 and recycled from time to time. The relatively small amount of off-gas passes out of the top of cyclone 40 through a flame arrestor 46 (if a combustible fluidizing gas is used) to a stack, a furnace, or to be recycled.

Turning now to FIG. 2, a fluidizing tube 18 in accordance with the present invention is shown. As can be seen, in the preferred embodiment the fluidizing tube 18 includes a lowermost gas delivering portion 48 with a tapered end 50 adapted to be disposed adjacent the tapered seat 16 of the bottom tube 12. The tapered end 50 has a conical surface disposed at an angle of about 60° from horizontal which corresponds to the shape of the tapered seat 16 of the bottom tube 12 (shown in phantom lines in FIG. 2). As is apparent, the conical shape of the tapered end 50 and the tapered seat 16 facilitate the smooth flow of the fluidized feed material out of bottom tube 12.

Gas delivering portion 48 further defines a plurality of apertures 52, 54, 56 for delivering the fluidizing gas to the powdered material within bottom tube 12 and feed hopper 10. More particularly, fluidizing tube 18 defines, preferably, at least four (4) apertures 52 disposed symmetrically circumferentially about lower portion 48 of fluidizing tube 18. In the illustrated embodiment, eight (8) such apertures 52 are provided. At least four (4) angled apertures 54 are also defined at a bore angle of about 45° from horizontal so as to fluidize powdered feed material disposed vertically upwardly from lower portion 48 of fluidizing tube 18. Again, in the illustrated embodiment eight (8) such apertures 54 are shown. Finally, fluidizing tube 18 further defines a bottom aperture 56 to deliver gas to combustible material that has been fed beyond fluidizing tube 18 and out of bottom tube 12 so that the fluidized state thereof will be maintained. Each of the apertures 52, 54, 56 provided in fluidizing tube 18 are formed with the same diameter so as to provide uniform fluidizing of the feed material.

The reproducibility of feed rate when the embodiment of FIG. 1 is used is illustrated for duplicate runs in Table 2 under the conditions listed in Table 1.

TABLE 1

| | |
|---|---|
| Bin charge | 180.96 lbs. |
| Natural gas flow to fluidizing tube | 0.46 ft³/min |
| Natural gas flow to bin fluidizing | 0.71 ft³/min |
| Bulk density of feed | 2.2 g/cc |
| Average density of feed | 4.5 g/cc |
| Gas velocity in fluidized bed (12" height × 2.067" ID) | 0.34 ft/sec |
| Gas velocity immediately above tip of fluidizing tube in 1.049" diameter feed section | 1.46 ft/sec |
| Delivery tube diameter | 0.375" |

TABLE 2

| | | Run I | | Run II | |
|---|---|---|---|---|---|
| Sample No. | Collection Time (Sec) | Wt (g) Delivered | Flow (g/sec) | Wt (g) Delivered | Flow Rate g/sec |
| Starting | 10 | 1643 | 164.3 | 1534 | 153.4 |
| 1 | 60 | 9545 | 159.08 | 9469 | 157.82 |
| 2 | 60 | 9486 | 158.10 | 9530 | 158.83 |
| 3 | 60 | 9578 | 159.63 | 9670 | 161.17 |
| 4 | 60 | 9559 | 159.37 | 9603 | 160.05 |
| 5 | 60 | 9268 | 154.47 | 9653 | 160.88 |
| 6 | 60 | 9252 | 154.20 | 9312 | 155.20 |
| 7 | 60 | 8406 | 140.10 | 9132 | 152.2 |
| 8 | 60 | 8111 | 135.18 | 7991 | 133.18 |
| 9 | 60 | 6940 | 115.67 | 5599 | 93.32 |
| 10 | 60 | 60 | bin empty | | bin empty |
| Average flow rates (1 through 6) | | 157.42 ± 2.55 g/sec | | 158.99 ± 2.25 g sec | |
| Grand average (1 through 6) with 71% bin drainage | | 158.23 ± 2.39 g/sec or 20.91 ± 0.32 lb./min | | | |

By maintaining the bin at least 30% full, it can be seen that good reproducibility of feed rates may be obtained with the fluidized bed feeder of the present invention. Further, inclusion of additional fluidizing nozzles 26 in the lower, conical portion of the cone of hopper 10 will permit a larger fraction of the bin charge to be drained with good feed rate reproducibility.

Figure 5:
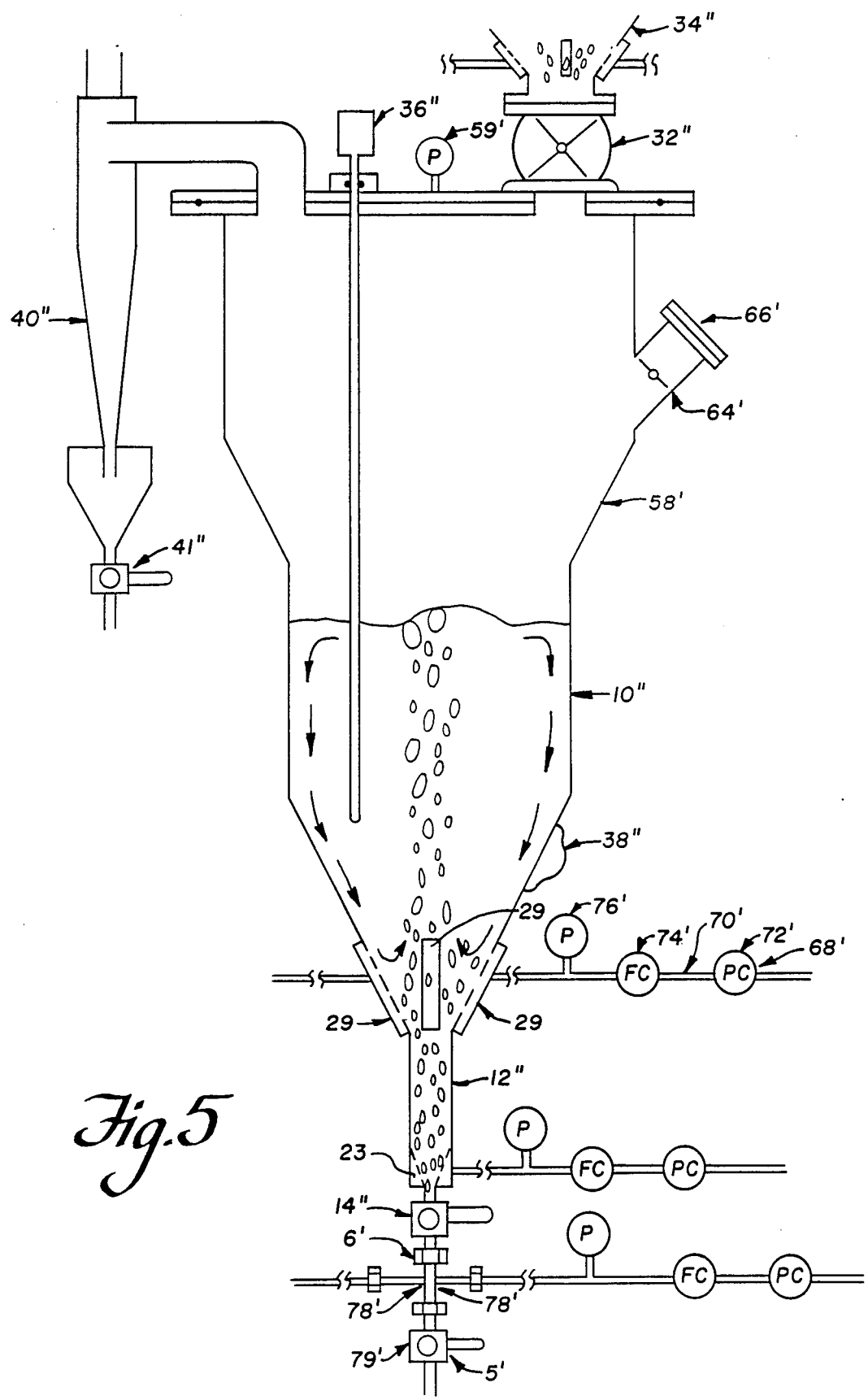
FIG. 5 is a schematic side elevation view of yet another fluidized bed feeder in accordance with the present invention.

While providing one or more fluidizing tubes 18 terminating in a nozzle 48 is the preferred apparatus and method for fluidizing the small central column of powder, an alternate apparatus and method is also suitable, as illustrated in FIG. 5.

In this embodiment, in place of the central fluidizing nozzle 48, the tapered bottom of the small fluidized bed is constructed as a gas filled plenum 23 with a porous conical inner surface. Using, for example, a sintered stainless steel sheet of specified porosity, a column of finely divided fluidizing gas bubbles can be generated within the powder when the plenum 23 is supplied with gas at controlled pressure and flow rate. Similarly, the auxillary nozzles 26 of the conical bottom of the larger powder reservoir 10 can be replaced by porous metal strips 29.

Figure 3:
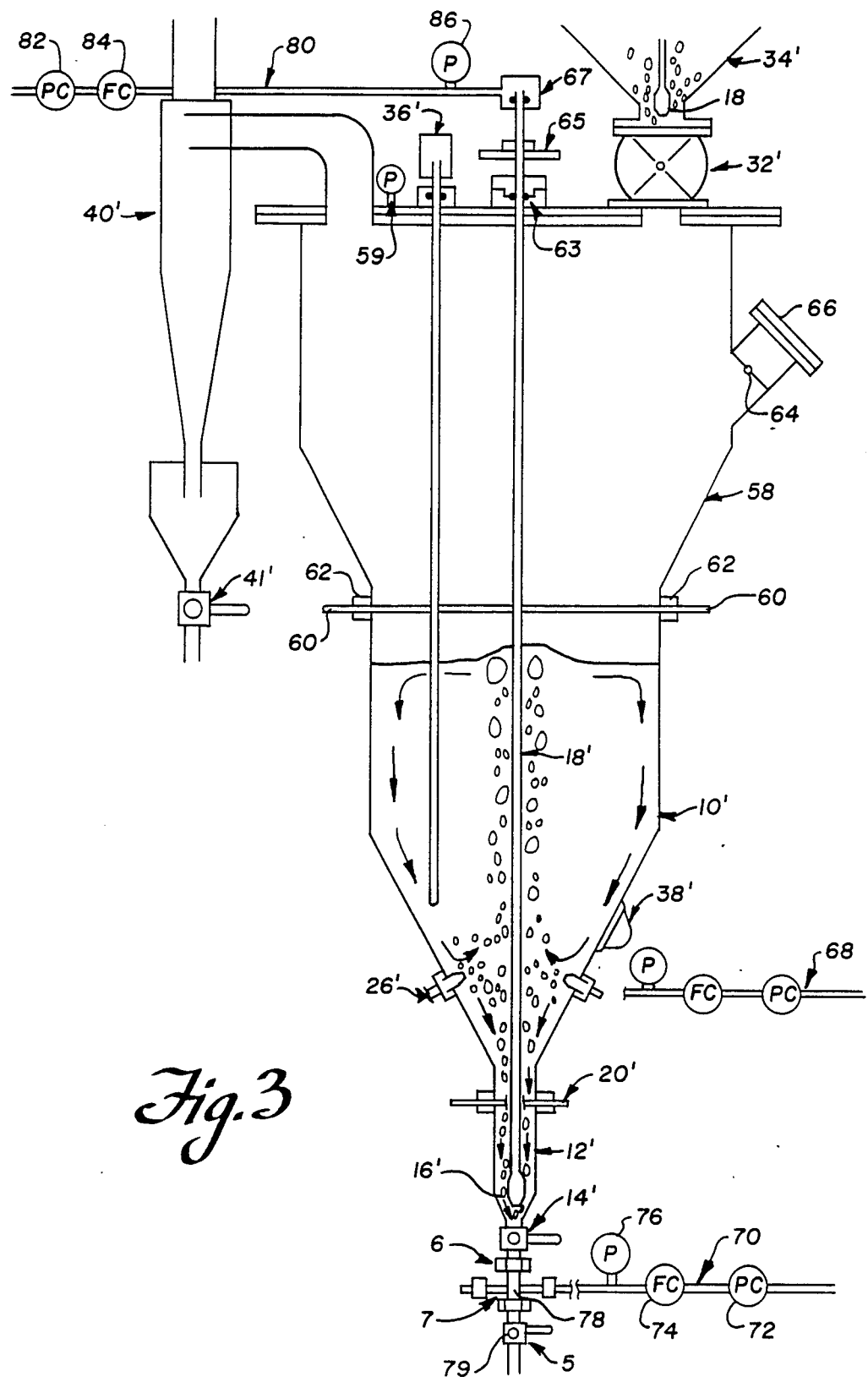
FIG. 3 is a schematic side elevation view of a second embodiment of the fluidized bed feeder of the present invention.

Referring now to FIG. 3, a second, presently most preferred embodiment of a fluidizing bed in accordance with the present invention is shown. As can be seen, this embodiment, in addition to the elements described with reference to FIG. 1, includes an upper, disengagement volume 58 coupled to and disposed above feed hopper 10' and a bin pressure gauge or indicator 59. Further, upper centering bearings or split ring sleeves 60 movable in gas tight bin wall penetrations 62 are provided to center fluidizing tube 18'. Additionally, in disengagement volume 58, a silica sight glass 66 and sight glass shield 64 are provided for observation of the fluidizing bed surface. This sight glass 66 may be provided with a sight glass gas sweep and window cleaner (not shown) if necessary.

Fluidizing tube 18' of this embodiment is provided with a lower gas tight rotary seal 63, a drive pully 65, and an upper rotating seal 67 so that fluidizing tube 18' may be raised, lowered, and rotated as deemed necessary for the material being fed.

As can be further seen in FIG. 3, lower bin fluidizing nozzles 26' are coupled to a gas supplying manifold 68 which controls the pressure of fluidized gas delivered to the feed hopper during operation of the apparatus. A second gas supply manifold 70 and third gas supply manifold (not shown) including supply pressure regulators 72, mass flow controllers or flow meters 74, and pressure gauges or indicators 76 are provided below ball valve 14' so as to provide opposed jet valves 78 to maintain fluidization of the feed material as it passes from the fluidizing bed feeder. A second ball valve 79 is preferably provided below opposed jet valves 78 for additional delivery control. Further, to insure control of the delivery of feed material from and to the various portions of the fluidized bed feeder, automatic control of the various valves 14', 79, and 41' is advisable.

A fourth gas supply manifold 80 is provided for fluidizing tube 18' so as to control and monitor the gas delivered to the fluidized bed therethrough. It too includes a supply pressure regulator 82, mass flow controller or flow meter 84 and a pressure gauge or indicator 86.

To insure proper functioning of the fluidized bed feeder, the gas pressure delivered through each of the supply manifolds should be constant and separately adjustable.

Figure 4:
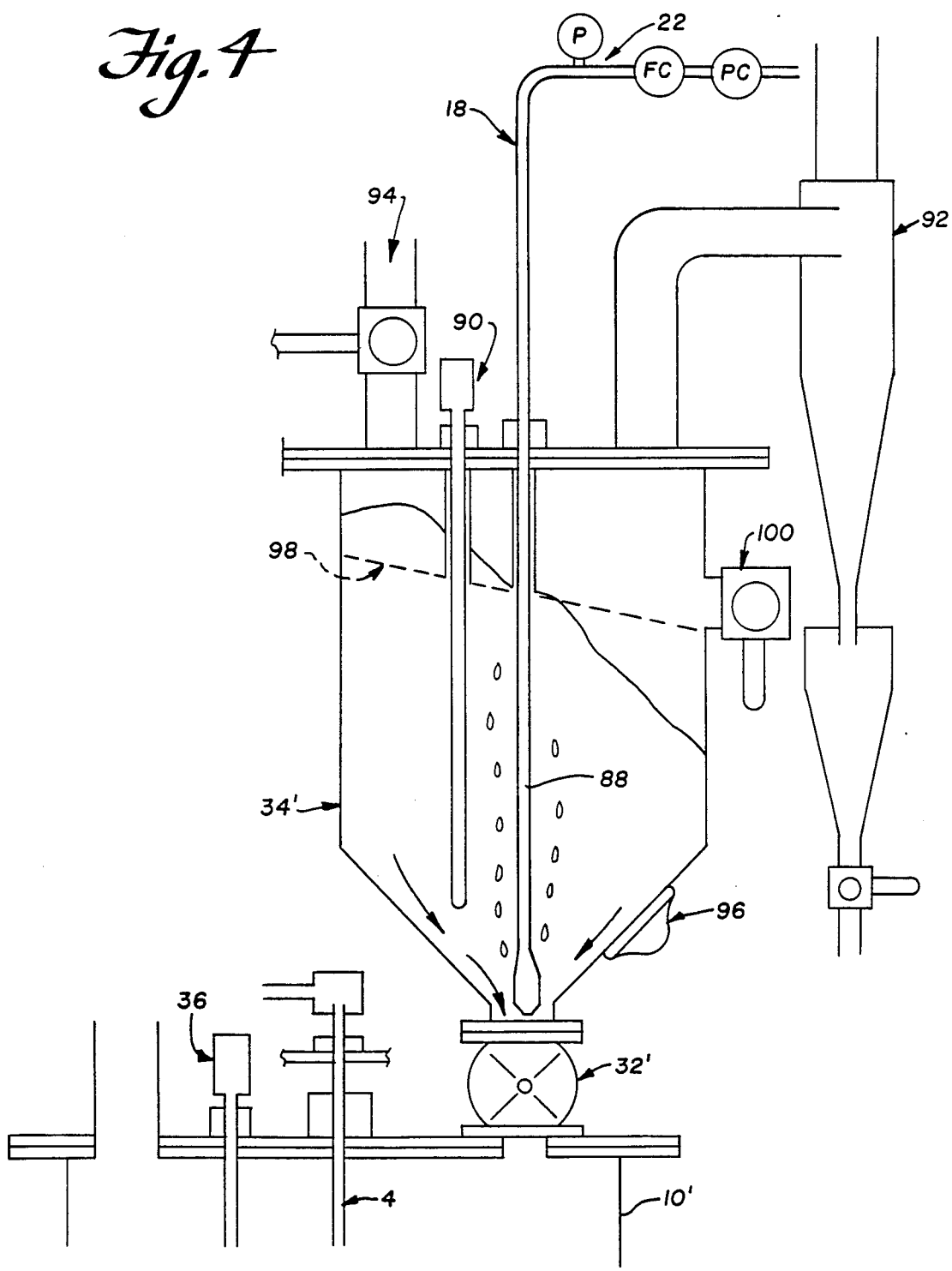
FIG. 4 is a schematic side elevation view of a powder feed hopper for use with a fluidized bed feeder in accordance with the present invention.

Referring now to FIG. 4, a powder feed hopper 34' for use, for example, with the fluidizing bed feeder of FIG. 3 is shown. Powder feed hopper 34' includes a fluidizing tube 88, level indicator 90, cyclone 92, powder feed line 94, and heavy duty vibrators 96, only one of which is shown for clarity, provided at 90° relative to one another.

In order for the fluidized bed feeder to function properly it is necessary the powder be dry enough so that particles do not adhere to one another. In addition, the powder fed to the system must be free of oversize powder or clumps of powder and other objects larger than one fifth of the diameter of the exit tube being used. To this end, powder feed hopper 34' further includes a metal screen 98 for preventing oversized objects or powder clumps from entering the fluidizing chamber of powder feed hopper 34' as well as a screen clean out port 100 for removing debris that will not pass through screen 98.

The base of the powder feed hopper 34' is coupled by way of a gas tight star feeder 32' which, as was disclosed above, is operatively associated with the level indicator 36' of the fluidizing bed feeder 10' so as to control the amount of powder delivered from the powder feed hopper 34' to the fluidized bed feeder.

A number of tests have been carried out on a system comprising the preferred components of the fluidized bed feeder shown in FIGS. 3 and 4. Minus 20 mesh Morenci copper concentrate was used for these tests with air as the fluidizing gas. After a ten second initial drain from the fluidizing bed, plastic buckets were used to collect fluidized concentrate as it continued to flow from the feeder. Buckets were exchanged at one minute intervals and later weighted on a 5000 gram scale. Table 3 shows the effect of varying air flow to the opposed jet valves 78 at the base of the feeder on powder mass flow from the fluidized bed feeder. For these runs, the fluidizing tube 18' and bin nozzle 26' air flows were kept fairly constant. Further, the bin 10' was vibrated and the fluidizing tube 18 rotated at 2 times per second.

TABLE 3

Mass Flow of Concentrate vs Air to Opposed - Jets 78

| Air setting to Opposed-Jet Valve | Bin Level % | Number of Samples | Mass Flow lbs/min | % Standard Deviation |
|---|---|---|---|---|
| 0 | 50–99 | 4 | 31.775 ± 1.751 | 5.5 |
| 1.58 ± .425 | 60–95 | 5 | 17.709 ± .359 | 2.03 |
| 3.0 | 70–85 | 15 | 15.471 ± .944 | 6.10 |
| 3.4 | 70–85 | 15 | 12.230 ± .426 | 3.48 |
| 3.4 | 70–85 | 15 | 12.248 ± .248 | 2.03 |
| 3.7 | 70–85 | 15 | 10.297 ± .283 | 2.74 |
| 3.7 | 70–85 | 15 | 10.691 ± .309 | 2.89 |
| 4.7 ± .1 | 70–85 | 4 | 6.004 ± .194 | 3.23 |

From the above table it can be seen that increasing air flow through opposed jet valves 78 decreases the mass flow of powder, in this instance by a factor of five.

The effect of the height of fluidized powder in bin 10' is indicated in Table 4, below. During these trials, somewhat higher air flows were provided through bin fluidizing nozzles 26'. Further, these tests were carried out with fluidizing tube 18' rotation of 2/second and full bin 10' vibration.

TABLE 4

Mass Flow of Concentrate vs Bin Powder Level

| Air setting to Opposed-Jet Valve | Bin Level % | Number of Samples | Mass Flow lbs/min | % Standard Deviation |
|---|---|---|---|---|
| 4.0 | 50–84 | 8 | 6.251 ± .249 | 3.98 |
| 4.0 | 10–47 | 7 | 5.475 ± .273 | 4.98 |
| 3.0 | 60–85 | 10 | 13.754 ± .543 | 3.94 |
| 3.0 | 20–50 | 12 | 11.170 ± .359 | 3.32 |

The above table illustrates an appreciable drop in mass flow rate occurs as bin level drops. Thus, in order to produce consistent mass flow of powder, it is imperative to maintain a constant bin level.

When mass flow rates of concentrate are compared both with and without slow tube rotation, the differences appear to be relatively minor. Representative data are shown in Table 5.

TABLE 5

Mass Flow of Concentrate with and without Rotation of the Fluidization Tube

| Air Set to Jet Valve | Rotation | Bin Level % | Number of Samples | Mass Flow lbs/min | % Standard Deviation |
|---|---|---|---|---|---|
| 3.0 | 2/sec | 70–85 | 15 | 15.471 ± .944 | 6.10 |
| 3.0 | 0 | 70–85 | 10 | 15.858 ± .189 | 2.58 |
| 3.4 | 2/sec | 70–85 | 15 | 12.230 ± .426 | 3.48 |
| 3.4 | 0 | 70–85 | 15 | 12.997 ± .353 | 2.72 |
| 3.4 | 0 | 72–84 | 10 | 12.340 ± .393 | 3.19 |
| 3.5 | 0 | 69–77 | 7 | 11.950 ± .233 | 1.95 |

On the basis of this limited data, it would appear that slightly higher mass flows of concentrate are produced for fixed fluidization conditions when the fluidization tube 18' is stationary. Reproducibility of mass flows also seems to improve slightly when the fluidization tube 18' is stationary.

In order to alter mass flow rates without changing the gas to powder mass flow ratios appreciably, it is only necessary to alter the opening provided by ball valves 14' and 79. Thus, as long as the exit dimensions are greater than five times the powder dimensions, turndown ratios of 20 to 1 or more can be achieved. By combining ball valve openings and opposed jet valve control, a wide variety of mass flows can be reached for both gas and powder delivery.

As is further apparent from the foregoing, the invention provides a method of delivering powder in a fluidized state from a sizeable powder reservoir, in which only a fraction of the powder in the system is completely fluidized. The fluidizing gas requirements are therefore greatly reduced over that needed for a conventional fluidized bed. Thus, the ratio of gas for fluidizing the lower central fluidized bed, as well as for feeding incompletely fluidized powder from the large reservoir to this small fluidized column, can be roughly in the ratio of three times the square of the small column diameter to the square of the powder reservoir diameter.

As an illustration, a 2 inch central fluidizing tube affixed to a 20 inch diameter cylindrical reservoir with conical bottom requires a gas flow proportional to $(2)^2$ or 4 as against $(20)^2$ or 400, merely for fluidization. This is 1/100th the gas volume that would otherwise be required to completely fluidzed a 20 inch diameter fluidizing bed. In addition, however, up to twice the column of gas required to fluidized the small central column may be necessary within the conical powder reservoir bottom to feed incompletely fluidized powder within the reservoir to the central completely fluidized column. Consequently, the total volume of fluidizing gas may range up to three times that required for the central column alone, making a total gas requirement for the above illustrated example of 4 times 3 or 12 to 400, or 1/33rd the gas needed for completely fluidizing a 20 inch dimater fluidizing bed.

Utilizing a prototype of the above appartus, both powdered coal and coal char were fluidized in natural gas and delivered to a cyclone burner. Both burned satisfactorily in air without flame-out. This shows that coal and char supplied in natural gas can be burned safely in a power plant boiler where flame-out is an over-riding concern. Thus, off specification coal which has low volatile content and an accompanying lower cost may be used by power producers. Similarly, higher sulfur coal and low sulfur devolatilized coal or char can be blended in the fluidized bed and delivered to a burner in a natural gas of low sulfur content in such proportions as to result in sulphur dioxide emissions that meet air quality standards.

Alternatively, high sulfur coal can be blended with sulfur trapping additives such as powdered calcium carbonate, oxide, or hydroxide, in this fluidized bed feeder. When the thoroughly blended mixture, entrained in natural gas, is burned in oxygen enriched air or oxygen, the sulphur is trapped as gypsum in the flue dust.

Further, copper sulfide concentrate fluidized in natural gas and fed to an oxy-concentrate burner from the fluidized bed of the present invention ignites immediately so that the well dispersed concentrate reacts with oxygen as soon as it reaches the burner mouth. Indeed, the fluidized concentrate flows uniformly and steadily as a liquid, its entrainment in natural gas ensuring that flame-out will not occur.

The advantageous features of the present invention may also be used to provide a low energy method of dispersing powder mixtures in a liquid such as water or oil with minimal particle attrition, by replacing gas within the lower bin fluidizing tube and nozzles with liquid. Such a dispersion can then be dispensed reproducibly at uniform mass flow rates if peripheral equipment is suitably modified.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluidizing bed feeder comprising:

a first hopper having a conical lower portion and a lid element;

a bottom tubular element operatively coupled to a lower most portion of said conical portion;

means for delivering fluidizing gas to said tubular element comprising an elongated fluidizing tube coupled to said lid element, extending through said first hoppper, and having a distal end disposed within said bottom tubular element so as to terminate in a lower portion of said bottom tubular element, said distal end defining a plurality of gas delivering apertures for delivering gas to material in said lower portion of said bottom tubular element; and means for delivering powered feed material to said first hopper whereby, said powered feed material may be fluidized by said fluidizing gas.

2. A fluidizing bed feeder as claimed in claim 1, wherein said means for delivering gas further comprises a plurality of gas delivering nozzles disposed at circumferentially spaced points about said conical portion.

3. A fluidizing bed feeder as claimed in claim 1, wherein said means for delivering powder comprises a star feeding element operatively coupled to said lid element and a second hopper disposed above and coupled to said star feeder for delivering powder to said star feeder.

4. A fluidizing bed feeder as claimed in claim 3, and further comprising means for delivering a fluidizing gas to powder in said second hopper.

5. A fluidizing bed feeder as claimed in claim 1, and further comprising means for vibrating said conical portion of said first hopper.

6. A fluidizing bed feeder as claimed in claim 1, and further comprising means for removing gas from said first hopper.

7. A fluidizing bed feeder as claimed in claim 1, and further comprising means for controlling the level of material within said first hopper.

8. A fluidizing bed feeder as claimed in claim 7, wherein said means for controlling comprises as a level monitor operatively coupled to said star feeder so that the level monitored by said level monitor controls the operation of said star feeder.

9. A fluidizing bed feeder as claimed in claim 1, and further comprising means for rotating said fluidizing tube.

10. A fluidizing bed feeder as claimed in claim 1, wherein said means for delivering gas further includes opposed jet valves coupled to a lowermost portion of said bottom tubular element for delivering fluidizing gas to the material fed from said bottom tubular element.

11. A fluidizing bed feeder as claimed in claim 10, and further comprising the means for independently monitoring and means for independently controlling gas flow to said fluidizing tube, said fluidizing nozzles, and each of said opposed jet valves.

12. A fluidizing bed feeder as claimed in claim 3, and further comprising means for controlling the particle size of the powder delivered to said first hopper.

13. A fluidizing bed feeder as claimed in claim 12, wherein said means for controlling particle size comprises a screen disposed in said second hopper for preventing particles larger than a predetermined size from being fed from said second hopper to said first hopper.

14. A fluidizing bed feeder as claimed in claim 1, wherein said distal end of said fluidizing tube includes a tapered upper portion, a tapered lower portion, and a substantially cylindrical portion between said upper and lower portions, said gas delivering apertures being provided at least through said upper portion and said cylindrical portion, said bottom tubular element including an inwardly tapered bottommost surface, said lower conical portion of said distal element being disposed adjacent the conical surface of said bottom tubular element, whereby fluidized powdered feed material may flow from said bottom tubular element in a uniform manner.

15. A fluidizing bed feeder as claimed in claim 1 and further comprising means for removing fluidized material from a bottommost portion of said bottom tubular element.

16. A fluidizied bed feeder as claimed in claim 15, wherein said means for removing includes valve means to control the removal of material.

17. A fluidizing tube for a fluidizing bed feeder comprising:

an elongated tubular member adapted to be coupled to a lid of the bed feeder and to extend through the bed feeder; and a distal end portion having an enlarged cross section relative to said elongated tubular member, said distal end portion having a tapered upper surface, a tapered lower surface, and a substantially cylindrical portion between said upper surface and said lower surface, said distal end defining a plurality of gas delivering apertures extending through at least said upper surface and said cylindrical surface and at least one gas delivering aperture extending through a bottommost surface of said distal end.

18. A fluidizing bed feeder comprising;

a container having a first end and second end, a cross-sectional area of said container generally decreasing from said first end to said second end;

means for introducing a fluidizing fluid centrally adjacent said second end;

means for introducing powdered feed material into said first end;

means for removing fluid powdered feed material from a lower most portion of said second end; and opposed jet valve means coupled to said lower most portion of said second end for delivering fluidizing fluid to the material fed from said lower most portion.

19. A fluidizing bed feeder as claimed in claim 18, wherein said means for introducing a fluidizing fluid comprises an elongated fluidizing tube coupled to said first end of said container, extending through said container, and having a distal end disposed adjacent said second end of said container, said distal end defining a plurality of gas delivering apertures.

20. A fluidizing bed feeder as claimed in claim 19, wherein said means for introducing a fluidizing fluid further comprises a plurality of gas delivering nozzles disposed at circumferentially spaced points about said container.

21. A fluidizing bed feeder as claimed in claim 19, wherein said means for introducing powdered feed material comprises a star feeding element operatively coupled to said first end of said container and a second container disposed above and coupled to said star feeder for delivering powdered feed material to said star feeder.

22. A fluidizing bed feeder as claimed in claim 18 and further comprising valve means for controlling removal of material from said lowermost portion.

23. A fluidizing bed feeder as claimed in claim 18, wherein said means for introducing a fluidizing fluid comprises a plenum with a porous conical surface disposed adjacent said second end.

24. A fluidizing bed feeder as claimed in claim 23, wherein said means for introducing a fluidizing fluid further comprises a plurality of porous metal strips dispsed at circumferentially spaced point about said container.

25. A method of feeding combustible material to a burner of a furnace comprising:
   delivering powdered material to a first hopper having a conical lower portion, a lid element, and a bottom tubular element operatively coupled to a lower most portion of said conical portion;
   delivering a fluidized gas to said bottom tubular element, including delivering gas through a fluidizing tube coupled to said lid element and having a distal end disposed within said bottom tubular element so as to terminate adjacent a lower portion of said bottom tubular element so that gas is delivered to material in said lower portion of said bottom tubular element; and
   controllably feeding fluidized material from said bottom tubular element to said burner.

26. A method as claimed in claim 25, wherein said step of delivering gas further comprises delivering gas to circumferentially spaced portions of said conical portion.

27. A method as claimed in claim 25, and further comprising vibrating the conical portion of said first hopper.

28. A method as claimed in claim 25, and further comprising rotating said fluidizing tube while gas is being delivered therethrough.

29. A method as claimed in claim 25, wherein said step of delivering powdered material comprises feeding powdered material from a second hopper through a star feeder which is coupled to said lid of said first hopper.

30. A method as claimed in claim 29, further comprising monitoring the level of powdered material within said first hopper.

31. A method as claimed in claim 30, and further comprising controlling said star feeder in response to said monitored level.

32. A method as claimed in claim 25, wherein said step of delivering gas further comprises delivering gas to the material being fed from said bottom tubular element.

33. A method as claimed in claim 29, and further comprising delivering a fluidizing gas to powder in said second hopper.

34. A method as claimed in claim 29, and further comprising controlling the particle size of the powder delivered to said first hopper.

35. A method as claimed in claim 34, wherein said step of controlling particle size comprises passing said powdered material through a screen disposed within said second hopper.

* * * * *